ARTHUR G. ROCKWOOD
*INVENTOR.*

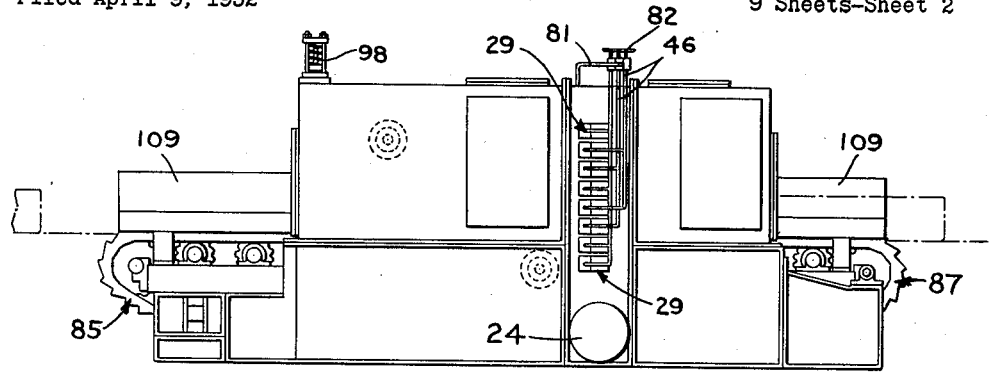
FIG. 2
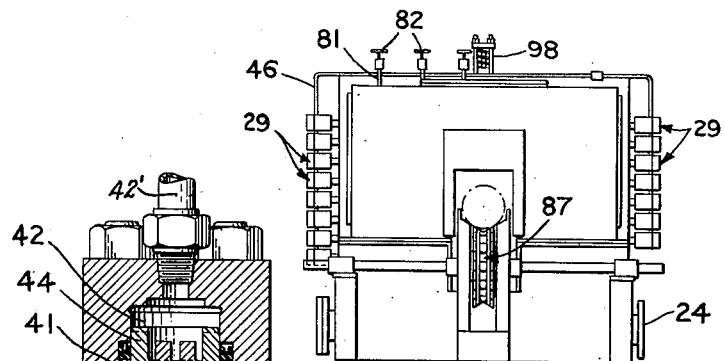
FIG. 3
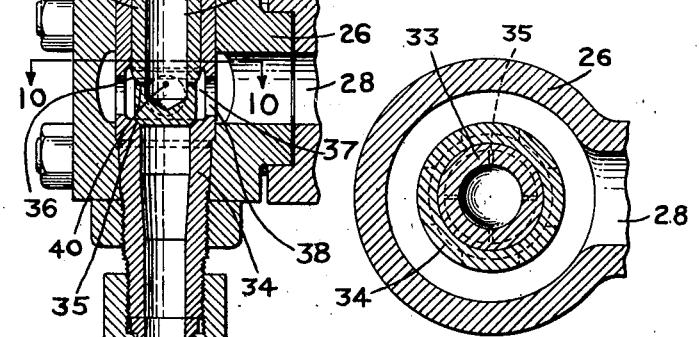
FIG. 9
FIG. 10
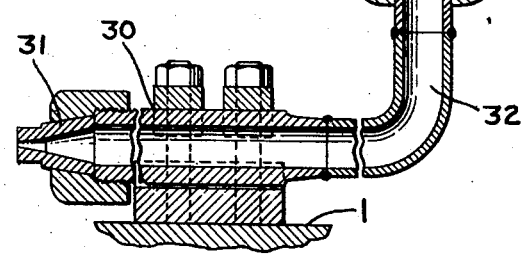
ARTHUR G. ROCKWOOD
INVENTOR.
BY June 30, 1953 A. G. ROCKWOOD 2,643,691
HYDRAULIC LOG DEBARKER
Filed April 9, 1952 9 Sheets-Sheet 3

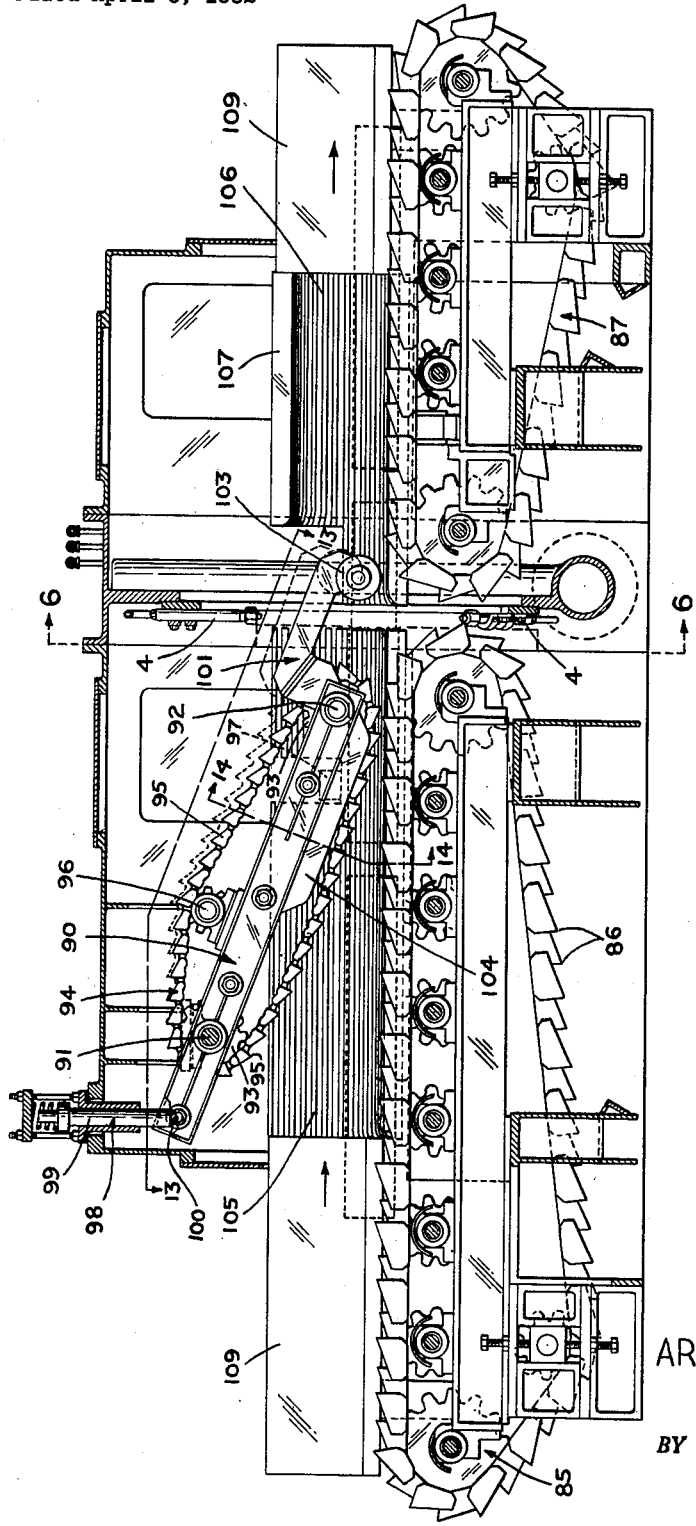

ARTHUR G. ROCKWOOD
*INVENTOR.*

ARTHUR G. ROCKWOOD
INVENTOR.

June 30, 1953     A. G. ROCKWOOD     2,643,691
HYDRAULIC LOG DEBARKER

Filed April 9, 1952                                      9 Sheets-Sheet 8

ARTHUR G. ROCKWOOD
*INVENTOR.*

BY *[signature]*
*attorney*

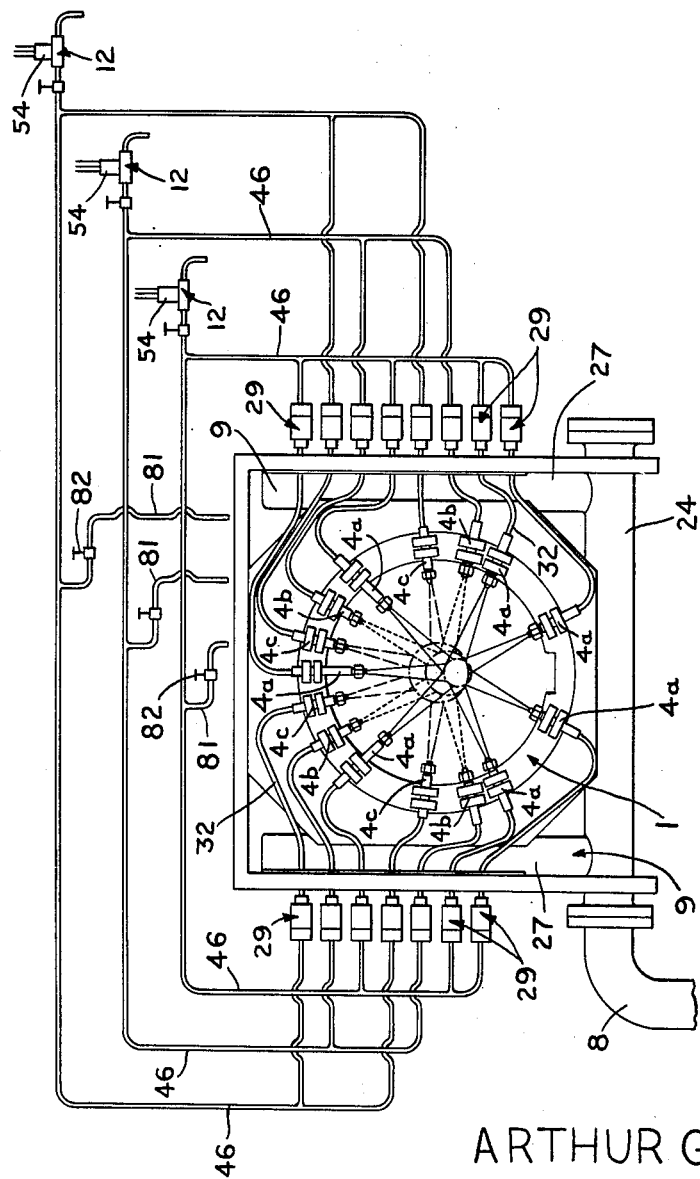

Patented June 30, 1953

2,643,691

UNITED STATES PATENT OFFICE 2,643,691

HYDRAULIC LOG DEBARKER

Arthur G. Rockwood, Nutley, N. J., assignor to Worthington Corporation, Harrison, N. J., a corporation of Delaware Application April 9, 1952, Serial No. 281,382

7 Claims. (Cl. 144—208)

This invention relates to apparatus for removing the bark from logs by high pressure streams of water, i. e., to hydraulic log debarking apparatus.

An object of the present invention is to provide a hydraulic log debarker which will remove the bark from a log in a minimum length of time so that a maximum number of logs may be debarked per day or in any given period of time.

The hydraulic debarker includes a plurality of nozzles arranged in sets, each set being under control of a bleed-off control valve, operation of which is in turn controlled through an electric control panel so that the proper set and number of nozzles will be operated to debark a log in accordance with the diameter of the log. The hydraulic debarker also embodies pressure governors and companion mechanisms whereby operation of the nozzles will be prevented provided the pressure of the debarking water falls below a predetermined pressure and will bleed off pressure water in the event the pressure of the debarking water goes above a predetermined degree.

The hydraulic log debarker of the present invention is particularly adapatable for barking relatively small short logs such as are processed in pulp mills. Such logs, during their progress through a hydraulic debarker utilizing high pressure jets of water for removing the bark from the logs, when contacted by the high pressure water jets have a tendency to "jump around," tip or otherwise become displaced from their proper path of travel, resulting in improper debarking of the logs, clogging of the log passage and sometimes breakage of parts of the debarker. Therefore, one object of the present invention is to provide in a hydraulic log debarker, utilizing high pressure jets of water for removing the bark from logs, means for preventing displacement of the logs during the debarking operation which means further cooperates with the log feeding means for moving the logs through the debarker.

With these and other objects in view, as may appear from the accompanying specification, the invention consists of various features of construction and combination of parts, which will be first described in connection with the accompanying drawings, showing a hydraulic log debarker of a preferred form embodying the invention, and features forming the invention will be specifically pointed out in the claims.

In the drawings:

Figure 2 is a side elevation of the hydraulic log debarker.

Figure 3 is an end view of the debarker.

Figure 5 is a longitudinal section through the hydraulic log debarker.

Figure 9 is a longitudinal section, partly broken away, through a nozzle and its control valve and taken on the line 9—9 of Figure 6.

Figure 10 is a cross section taken on the line 10—10 of Figure 9.

Figure 16 is a diagrammatic view of the hydraulic log debarker illustrating the nozzle operation in accordance with the diameter of the log being debarked.

In describing the hydraulic log debarker in detail, a general description of parts and their operation will first be given in connection with Figure 1 of the drawings and, subsequently, the various elements embodied in the debarker will be specifically described.

Figure 1:
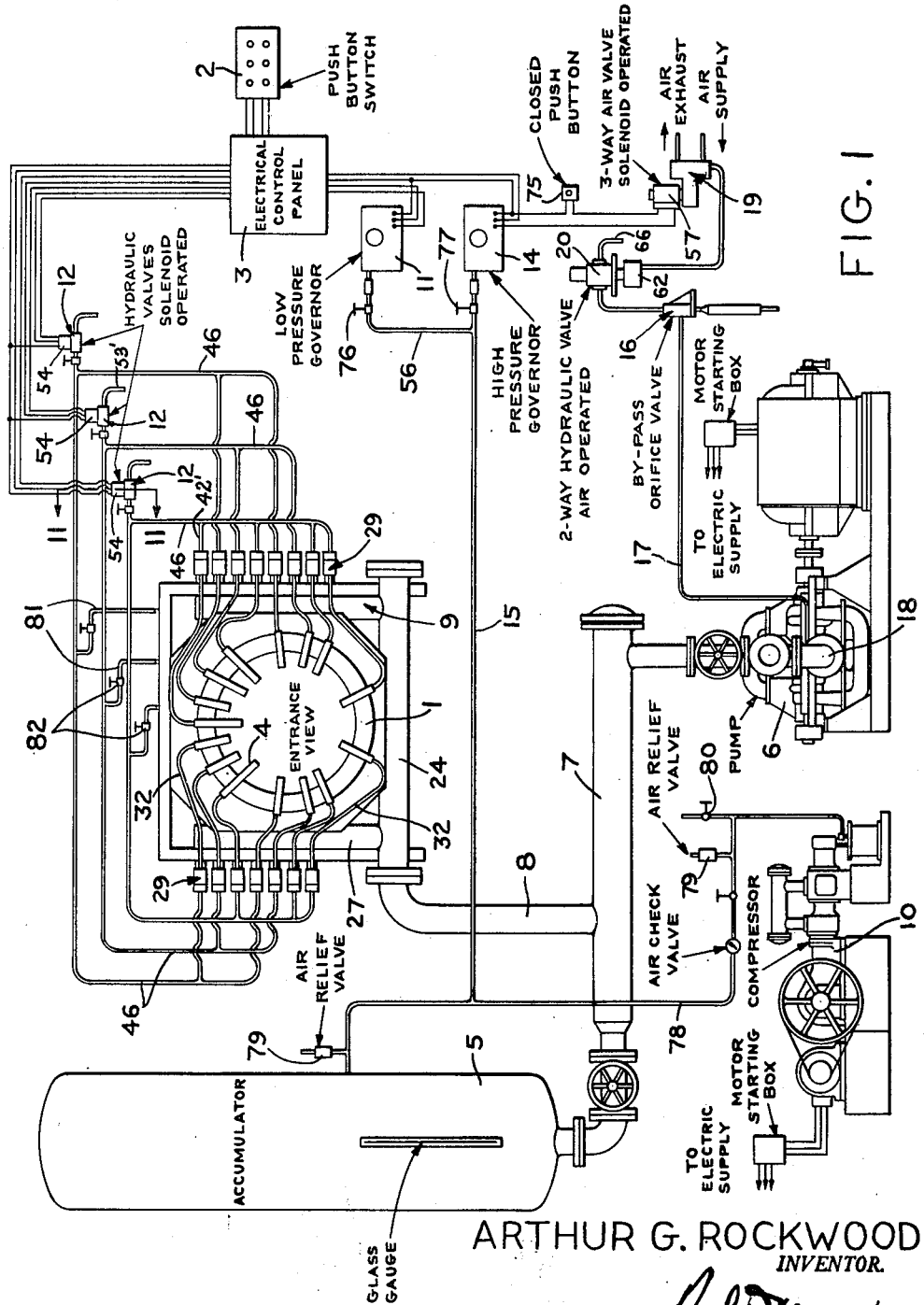
Figure 1 is a diagrammatic view of the hydraulic log debarker.
Figure 4:
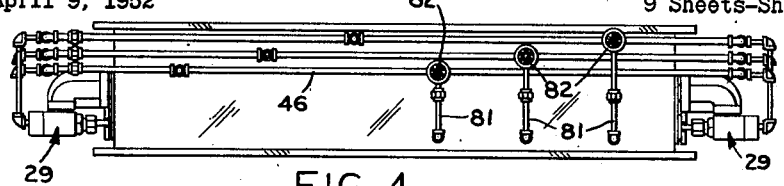
Figure 4 is a top plan of the debarker.

As shown in the diagrammatic Figure 1 of the drawings the hydraulic debarker comprises a nozzle carrying ring 1. The nozzle ring 1 is stationary and logs are moved through the stationary nozzle carrying ring 1 by log conveyors shown in detail in Figure 5 of the drawings. A predetermined number of streams of high pressure water impinge against the log as it passes through the ring 1 and the number of jets or streams directed against the log is manually controlled in accordance with the diameter of the log by the operator of the debarker through the medium of a plurality of electric push button switches 2 through an electrical control panel 3. The nozzles 4 are carried by the ring 1 and are connected in sets so that water will be projected from all of the nozzles of any one set simultaneously depending upon the actuation of the switches in the panel 2 by the operator.

An accumulator 5 of the usual type is employed and water is pumped from any suitable source (not shown) by a high pressure pump 6 through a suitable conduit 7 into the accumulator or from the high pressure pump 6 through the conduit 8 into the manifold structure 9 which will be hereinafter more specifically described. Air is pumped into the accumulator 5 by an air compressor 10 of any approved type so as to maintain a predetermined high pressure of air against the water in the accumulator, the air acting upon the water in the usual manner of accumulators of this type.

It is, of course, undesirable to project water against the log to be debarked when the pressure of the water is not sufficiently high to properly debark the log and to insure against such operation a low pressure governor 11 is provided which is connected through the electrical control panel 3 with the various solenoids of the control valves 12 and with the air space in the accumulator 5 so that when the pressure within the accumulator falls below a predetermined degree the low pressure governor 11 will act to prevent operation of the nozzles 4, i. e., to prevent the issue of streams of water from the nozzles.

Then again, it is also desirable that the pressure in the system does not rise so high as to cause damage to the parts of the debarker, and for the purpose of preventing excessive pressure in the system a high pressure governor 14 is provided. The high pressure governor 14 is connected to the interior of the accumulator 5 through a suitable conduit 15 and is connected to a by-pass bleed off valve structure 16 which has connection with a conduit 17 and thence with the discharge pipe 18 of the pump 6. Suitable mechanisms such as a solenoid operated three-way valve 19 and a two-way air operated valve 20 are connected between the high pressure governor 14 and the by-pass valve 16 to operate the by-pass valve 16 when the high pressure governor is operated by an excessive pressure in the accumulator. This opens the by-pass valve 16 and permits part of the discharge water to bleed off from the system and prevent accumulation of excessive pressure in the accumulator and system.

Figure 6:
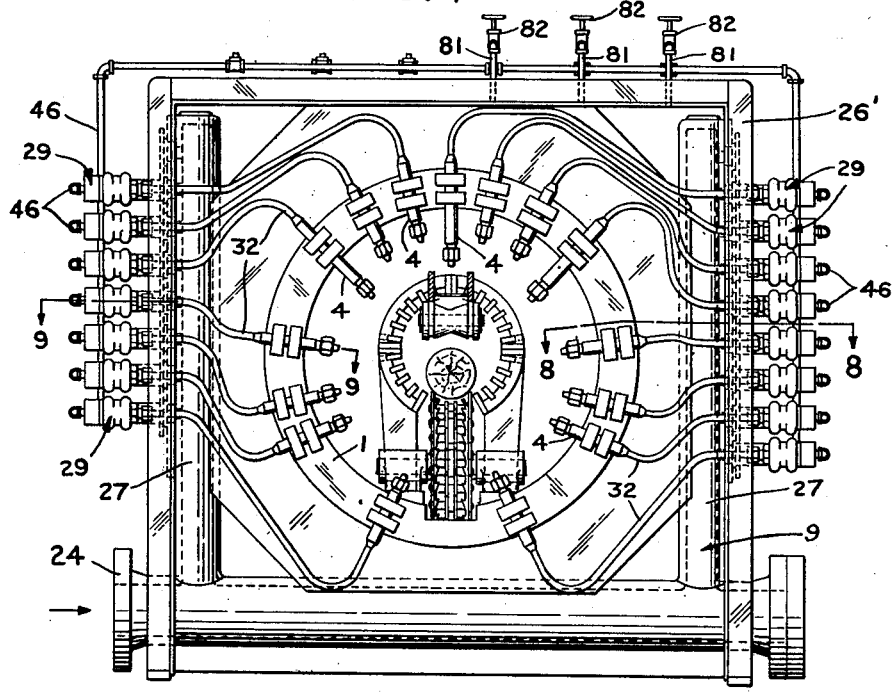
Figure 6 is a vertical cross section taken on the line 6—6 of Figure 4.

Referring particularly to the mechanisms of the hydraulic debarker the high pressure water from the conduit 8 is delivered to the horizontal section 24 of the manifold structure 9 carried by the supporting frame 26' (see Figure 6). The manifold structure 25 includes the upright sections 27 which are connected by passages 28 to nozzle valve structures 29, one of each of which is associated with each of the nozzles 4 carried by the ring 1. The nozzles 4 are carried by the ring 1 and are arranged on the radii of the ring as clearly shown in Figures 1, 6 and 16 of the drawings so that the nozzles will issue high pressure streams of water directly upon a log passing through the debarker for removing the bark therefrom. The nozzle structures, including their individual control valves, are specifically shown or illustrated in the sectional Figure 9 of the drawings and each nozzle 4 includes a nozzle structure 30 which is attached in any suitable manner to the ring 1 and has a removable tip 31 constructed to issue a chisel-like jet of high pressure water against a log. The nozzles 30 are connected to their individual valve structures 29 by suitable conduits 32.

All of the individual valve structures 29 are the same and include a reciprocating valve plunger 33 carried by the valve carrying sleeve 34 and when seated upon the valve seat 35 will cut off the flow of water to and through the nozzle 30. The plunger valve 33 has an annular shoulder 36 formed thereon which is located in the annular chamber 37 formed in the sleeve 34. The chamber 37 is open to the passage 28 by means of a plurality of openings 38 so that high pressure water enters and fills the chamber 37 and acts against the shoulder 36 to move the valve plunger into open posiiton. The valve plunger 33 is hollow providing an internal chamber 39 into which high pressure water bleeds or passes from the chamber 37 through the plurality of openings 40. The high pressure water which enters the chamber 39 passes out through a restricted orifice 41 in the head of the plunger valve 33 into a chamber 42 formed in the top of the nozzle valve housing 26. The head 44 of the plunger valve 33 which is seated in the chamber 42 is of a larger cross sectional area than the shoulder 36. The orifices 40 and 41 are arranged so that the pressure of the water bleeding into the chamber 42 acting on the enlarged head 44 of the plunger valve will counter-balance the pressure of the water in the chamber 37 acting on the shoulder 36 and thus the plunger valve will be held against its seat 35 until such time as the pressure in the chamber 42 is relieved, allowing an over-balancing of the pressure on the plunger valve and its consequent upward movement by the pressure of water acting on the shoulder 36, which will open the valve and permit the high pressure water to pass out through the nozzle 30.

The pressure in the chamber 42 is relieved through a series of mechanisms operated by one of the push button switches of the panel 2 and the various mechanisms are arranged and connected so that a predetermined number of nozzles will be operated to issue jets of high pressure water against the log in accordance with the diameter of the log.

The nozzle valves are arranged or connected in sets and the nozzle valves in one of the sets have all of their chambers 42 connected through suitable conduits 46 to one of the bleed off control valves 12 so that when any one of the bleed off solenoid operated valves 12 is operated to bleed the pressure from the chambers 42 of the various nozzle valves 29 connected thereto all of the nozzles in such set will be operated.

Figure 11:
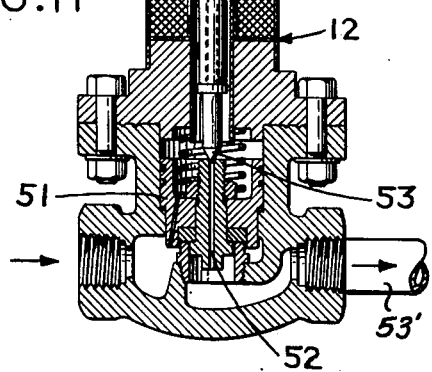
Figure 11 is a vertical section through a solenoid operated valve structure employed in the log debarker and taken on the line 11—11 of Figure 1.
Figure 7:
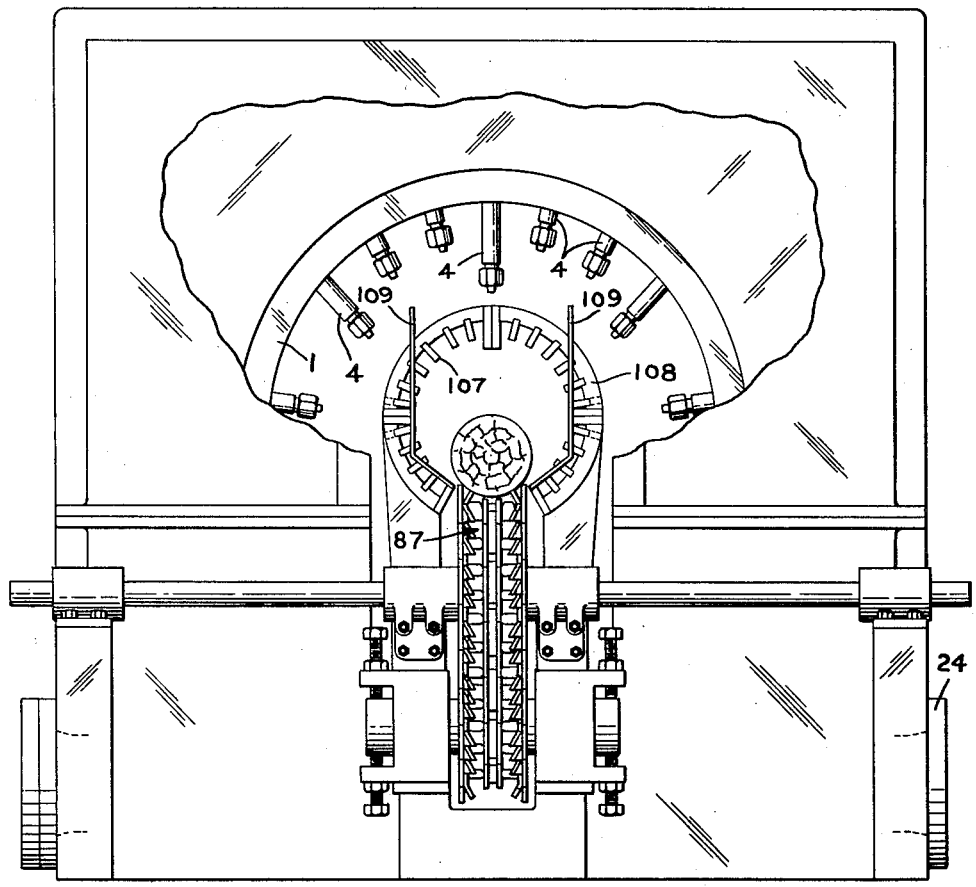
Figure 7 is an end view of the debarker having parts broken away.
Figure 8:
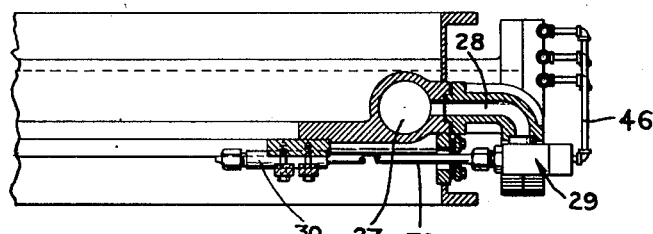
Figure 8 is a detail section taken approximately on the line 8—8 of Figure 6.

The control pressure bleed off valve 12 may be of any suitable construction which may be purchased upon the open market and one such type of valve is shown in detail in Figure 11 of the drawings. This type of valve includes a pressure balanced plunger valve 51 which is held seated to cut off flow of water therethrough by a balance of pressure on each end of the plunger valve 51. An orifice 52 extends through the plunger valve 51 and is normally closed by a needle valve 53. The needle valve 53 is actuated upon energizing of the solenoid coil 54 of the valve structure to permit an unbalancing of the pressure on the plunger valve 51 and allow the valve to open to bleed off the pressure from the chambers 42 of the respective nozzle structures through the connection 42' to the bleed off valve 12 and the bleed-off outlet 53'.

The solenoids 54 of the valve structures 12 are connected through the electrical control panel 3 with the switches of the push button switch structure 2 so that the operator of the debarker may by pushing one of the push button switches control the operation of the solenoid actuated control valves 12 and consequently control operation of the nozzles in the various sets permitting operation of only those which are necessary for proper debarking of the log in accordance with its size.

As shown in Figure 1 of the drawings and herein above generally referred to, a low pressure governor 11 of any approved construction which may be purchased upon the open market, is connected in the electrical circuit with the electrical control panel 3 and its pressure operated mechanism (not shown) is connected through the pipe 15 and a branch pipe 56 with the accumulator 5 so that when the pressure of the water in the accumulator 5 falls below a predetermined pressure degree the low pressure governor 11 will operate through the electrical control panel 3 to operate the various control valves 12 and cut off the supply of pressure water to any and all of the nozzles 30.

Figure 12:
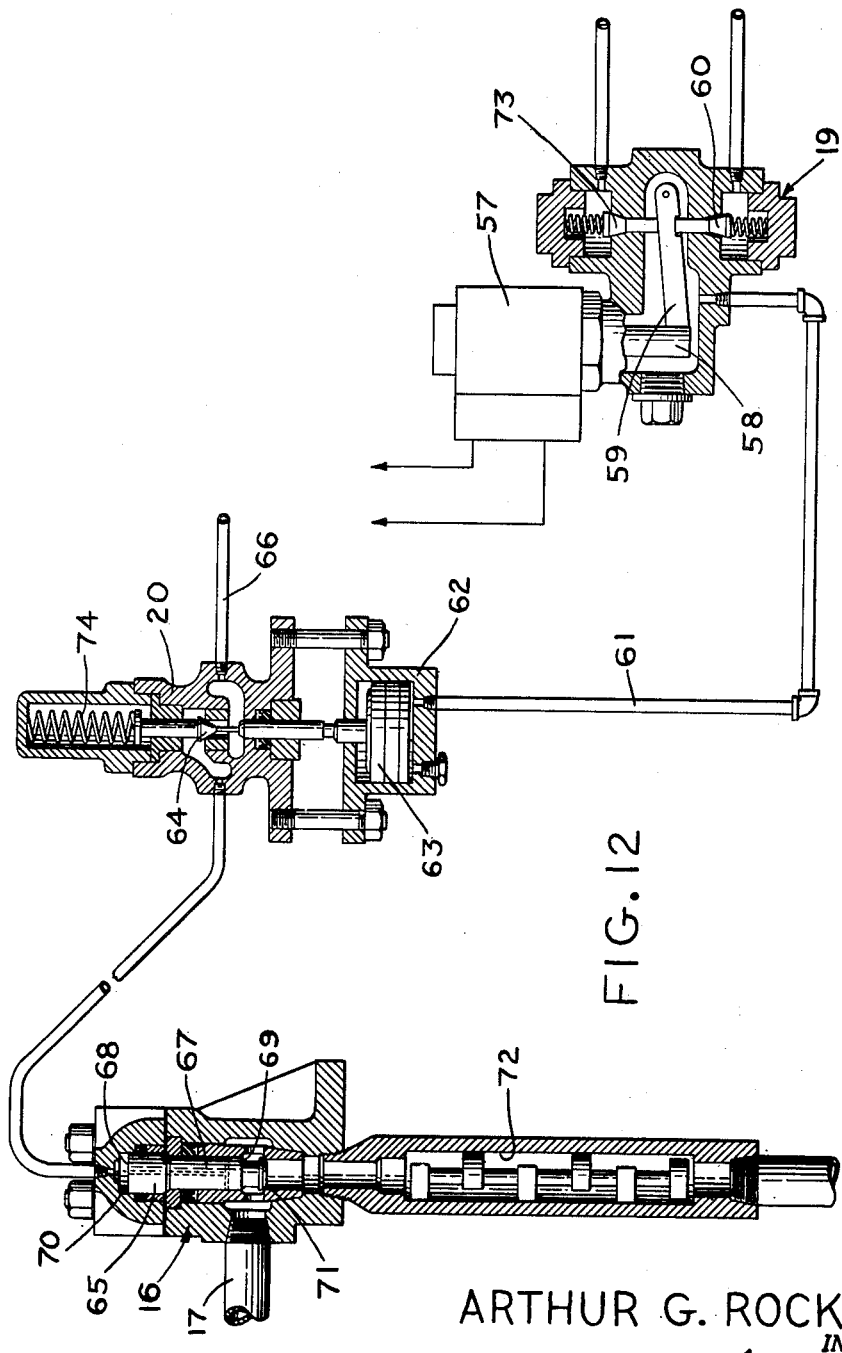
Figure 12 is a detail sectional view showing details of the safety control mechanism employed in the debarker.
Figure 13:
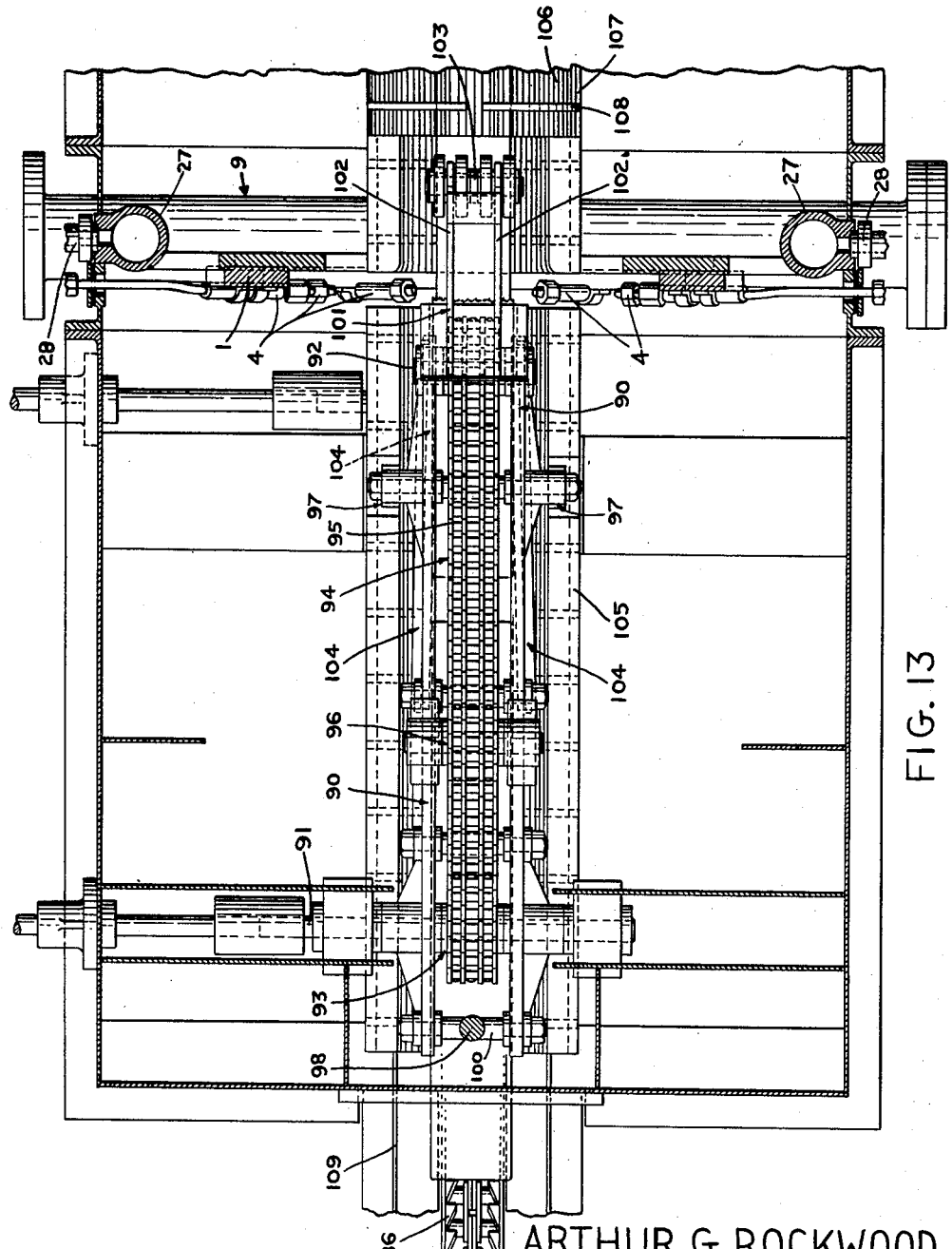
Figure 13 is a horizontal section through the log debarker showing in plan view the pressure member which cooperates in feeding logs through the debarker.
Figure 14:
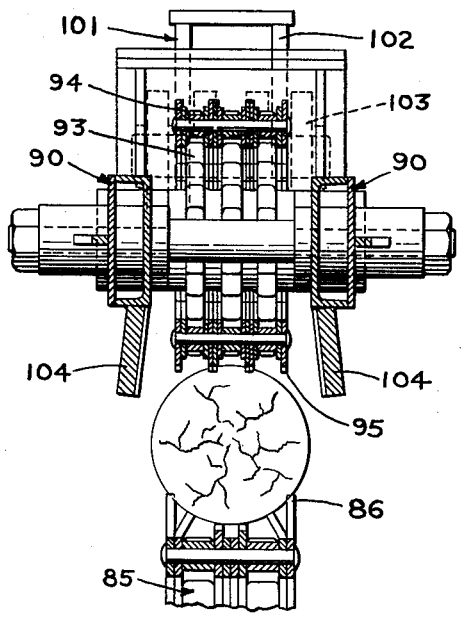
Figure 14 is a vertical section taken on the line 14—14 of Figure 5.
Figure 15:
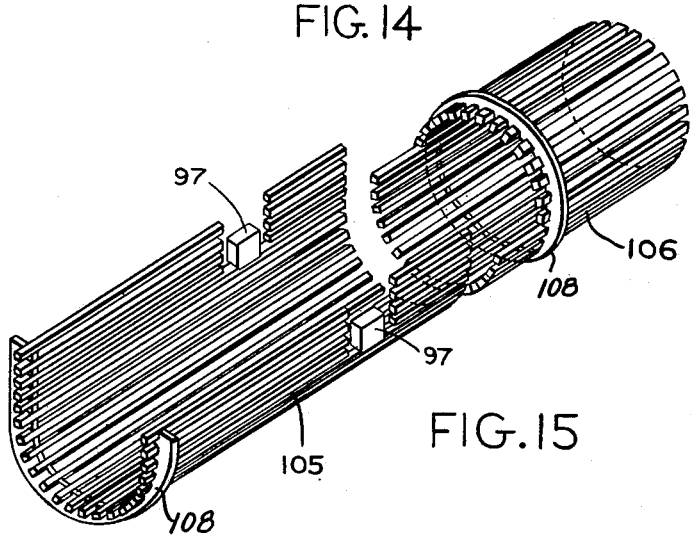
Figure 15 is a detail perspective view of a log confining cage employed in the debarker.

A high pressure governor 14 is connected by the pipe 15 with the accumulator 5 and this high pressure governor is of any approved construction which may be purchased upon the open market including a pressure actuated mechanism (not shown) which upon operation operates an electrical switch (not shown). The switch (not shown) in turn controls the energizing of the solenoid 57 of the three-way valve structure 19 (see Figures 1 and 12). The solenoid 57 has its core 58 connected to a pivoted valve actuating lever 59 so that when the high pressure governor 14 operates under a high pressure above a predetermined degree it will energize the solenoid 57 and open the valve 60 to permit high pressure air from any suitable source (not shown) to pass through the valve structure 19 and out through the pipe 61 into the cylinder 62 of the two-way pressure air operated hydraulic valve structure 20. When air under pressure enters the cylinder 62 it will move the piston 63 thereof upwardly which will unseat the valve 64 and allow high pressure water to bleed off from the valve structure 65 of the bleed off valve structure 16 to exhaust through the pipe 66. The valve structure 65 is of identical construction with the nozzle valve structure 29 and includes a piston valve 67 which is acted upon by high pressure water from the discharge 18 of the pump 6 through the pipe 17. Under normal conditions the piston valve 67 is held closed by the balance of pressure against its upper end 68 and the annular shoulder 69 formed thereon, but when the valve 64 is open and the space 70 in the top of the valve structure 67 is open to atmosphere through the valve 20 and the outlet 66 the pressure will be unbalanced and the piston valve 67 will move upwardly off of its seat 71 allowing high pressure water to bleed from the discharge 18 of the pump 6 through the pressure reducing orifice structure 72, to waste and thus lower the pressure of the water delivered to the accumulator 5 and consequently reduce the pressure of water in the accumulator. The valve 64 will remain open so long as the pressure in the accumulator is above the predetermined high degree required to operate the high pressure governor 14. As soon as the pressure in the accumulator 5 falls below the high pressure degree required to operate the high pressure governor 14 the solenoid 57 will be deenergized and the valve actuating lever 59 operated to close the valve 60 of the valve structure 19 and open the valve 73 of the valve structure 19 allowing the high pressure air to exhaust from the valve structure 19 and prevent its deliverance to the cylinder 62. At such time, the spring 74 will seat the valve 64 closing the connection between the space 68 and exhaust and permit the pressure to build up in the space 68 sufficiently to cause a closing of the valve 67 thereby cutting off the bleeding of high pressure water through the pressure reducing orifice 72.

The pressure reducing orifice 72 shown in the drawings is of a particular type but it is to be understood that any suitable type of pressure reducing device may be employed without departing from the spirit of the present invention. If it is so desired, a manually operated push button switch indicated at 75 may be connected in the circuit to the three-way solenoid operated valve structure 19, as shown in Figure 1 of the drawings to permit manual operation of the high pressure bleed off system. Manually operated valves 76 and 77 may be connected in the pressure lines between the low pressure governor 11 and the accumulator 5 and the high pressure governor 14 and the accumulator 5, if desired, to permit manual cutting out of these pressure governors.

Also, the high pressure air line 78 leading from the compressor 10 to the accumulator 5 may be provided with automatic air relief valves 79 and manually operated relief valves as shown at 80, if it is so desired.

Each of the conduits 46 leading from the nozzles in each set to the respective bleed off control valves 12 is provided with a bleed off branch 81 and manually operated valves 82 are provided in the bleed off branches so that if it is so desired manual control of the bleeding off of pressure from the chambers 42 of the nozzle valve structures 29 may be provided.

Figure 16 illustrates diagrammatically the operation of the nozzles in sets. It will be noted that certain of the nozzles, namely: an upper bank of nozzles 4a are longer than the remaining nozzles and project further inwardly toward the axis of the ring 1. The upper and lower banks of nozzles 4a are connected in one set and are adapted for debarking the smallest sized logs passed through the debarker as indicated by the solid lines in Figure 16. The nozzles 4b are connected in a second set under a separate control valve 12 and are all operated simultaneously for the debarking of a medium sized log while the nozzles 4c are all connected in a set and operated simultaneously to debark a larger sized log. It is understood, of course, that two or more of the sets of nozzles may be operated simultaneously for debarking logs and it is preferable to operate two or more sets of the nozzles when a log other than of minimum diameter is passed through the debarker. In fact the nozzles 4a, some of which direct high pressure streams of water against the bottom of the log, are always operated when any of the nozzles are in operation and thus to provide complete debarking of a log other than the minimum size the sets of nozzles 4a and either 4b or 4c, or both, are put in operation by operation of the push button switches of the panel 2 by the operator.

The mechanism for feeding the logs through the debarker and holding them in position during debarking is shown in Figures 5, 13, 14 and 15 of the drawings and includes an entrance conveyor 85 which receives the logs at the entrance to the debarker proper and delivers them to the point at which they are contacted by the streams of high pressure water issuing from the nozzles 4. This conveyor may be of any suitable type but is preferably of the endless chain type having teeth 86 on the chain which engage the log to move it steadily forward and an exit conveyor 87 also preferably of the toothed endless chain construction which picks up the logs after they pass through the nozzle ring 1 and conveys them to the outlet end of the debarker proper.

Since the present debarker is adapted for debarking small short logs of the type processed in many pulp mills it is necessary to provide means for holding the logs steady especially when they are first contacted with the high pressure streams of water and again as they leave the point of contact of the high pressure streams of water thereagainst since the logs being subjected to the high pressure streams of water have a tendency to "jump about," tilt or otherwise become displaced, resulting in imperfect debarking of the log and at times in clogging the debarker with the possible breakage of parts. To prevent such movements of the logs pressure means are provided for applying pressure to the logs to keep them steadily in position on the conveyors 85 and 87.

Such pressure means includes a frame 90 which is pivotally supported intermediate its ends upon a shaft 91 and which carries a second shaft 92 near its lower inner end. Suitable sprockets as indicated at 93 are rotatably carried by the shafts 91 and 92 and an endless chain 94 passes about the sprockets 93. The chain 94 has log engaging or gripping teeth 95 formed thereon which are disposed in confronting relation to the teeth 86 on the entrance conveyor 85. A suitable idler sprocket 96 is provided for maintaining the chain 94 taut at all times. The weight of the pressure device is considerable and its pivot is located near its outer upper end so that it will, by gravity, always be urged downwardly for contacting a log on the conveyor 85 and gripping the log sufficiently to prevent displacement of the log when it is engaged by the high pressure streams of water. The downward movement of the lower end of the pivoted pressure device is limited by a stop block 97 and is cushioned by a buffer structure 98, which also serves to limit its upward movement. The buffer structure 98 includes a spring pressed rod 99 which engages a cross pin 100 at the upper end of the frame 90.

An extension bracket 101 is attached to the inner end of the frame 90 and comprises a pair of spaced arms 102 which carry a pressure roller 103 at their outer ends. The pressure roller 103 is located so that it will engage the logs immediately after they pass through the nozzle ring 1.

Guard plates 104 are attached to and flare outwardly from the lower edges of the frame 90 and extend upwardly from the lower end of the frame along each side thereof to prevent lateral movement of the logs out of the scope of engagement of the chain 94 with the logs.

A perforated substantially U-shaped cage 105 is provided which extends from approximately the plane of the nozzle ring outwardly to the entrance end of the hydraulic debarker. A second cage 106 which is substantially cylindrical in cross section extends from approximately the plane of nozzle ring 1 to the outlet end of the debarker and it has a portion thereof cut away at its inner end to permit contact of the pressure roller 103 with the logs. The cages 105 and 106 may be formed of a plurality of longitudinally extending metal bars 107 supported by suitable supporting or bracing rings 108. Imperforate guiding plates 109 are located at each end of the debarker beyond the outer terminals of the cages 105 and 106 to prevent lateral displacement of logs beyond the log engaging portions of the entrance and exit conveyors outwardly of the cages.

It will be understood that the invention is not to be limited to the specific construction or arrangement of parts shown, but that they may be widely modified within the invention defined by the claims.

What is claimed is:

1. In a hydraulic log debarking apparatus, means for directing high pressure streams of water against a log to be debarked, a conveyor for moving logs through the debarker, means for preventing displacement of a log being impinged by said high pressure streams of water, said last-named means including a pivoted frame, an endless chain movably carried by said frame for engaging a log near its area of contact with the streams of water, said frame being movable upon its pivot by contact of the chain with a log to provide positioning of the chain in accordance with the diameter of the log engaged, an extension frame carried by said chain carrying frame and projecting beyond the area of contact of the streams of water with a log, a pressure roller carried by said extension frame for engagement with a log after it passes the area of contact by the streams of water.

2. In a hydraulic log debarking apparatus, means for directing high pressure streams of water against a log to be debarked, a conveyor for moving logs through the debarker, means for preventing displacement of a log being impinged by said high pressure streams of water, said last-named means including a pivoted frame, an endless chain movably carried by said frame for engaging a log near its area of contact with the streams of water, said frame being movable upon its pivot by contact of the chain with a log to provide positioning of the chain in accordance with the diameter of the log engaged, stop means for limiting the movement of said pivoted frame and chain towards said conveyor, and yieldable stop means for engagement by the end of the pivoted frame remote from the log engaging portion of the chain.

3. A hydraulic log debarker as claimed in claim 2 including guard plates carried by said pivoted frame at its lower side edges to prevent movement of a log beyond the log contacting width of the chain.

4. In a hydraulic log debarker, an entrance conveyor for moving logs into and partly through the debarker, means for preventing displacement of logs on said conveyor comprising a pressure member including a pivoted frame, an endless log engaging chain carried by said pivoted frame and movable by engagement with a log as the log is moved by said entrance conveyor, an exit conveyor for moving logs out of said debarker, an extension on said pivoted frame, and a pressure roller carried by said extension for engagement with a log at the receiving end of said exit conveyor.

5. A hydraulic log debarker as claimed in claim 4 including a substantially U-shaped perforated cage through which said entrance conveyor, a log thereon and said log engaging pressure member chain, move.

6. A hydraulic log debarker as claimed in claim 4 including a substantially U-shaped perforated cage through which said entrance conveyor, a log thereon and said log engaging pressure member chain, move, and a substantially cylindrical perforated cage through which said exit conveyor and a log thereon, move.

7. A hydraulic log debarker as claimed in claim 4 including guard plates carried by said pivoted frame at its lower side edges to prevent movement of a log laterally beyond the log contacting width of the chain.

ARTHUR G. ROCKWOOD.

References Cited in the file of this patent

UNITED STATES PATENTS

| Number | Name | Date |
|---|---|---|
| 2,338,136 | Shaw et al. | Jan. 4, 1944 |
| 2,568,554 | McClay | Sept. 18, 1951 |
| 2,578,804 | Holveck et al. | Dec. 18, 1951 |
| 2,605,794 | Guettler | Aug. 5, 1952 |